(No Model.)
G. E. WARING, Jr.
METHOD OF DEODORIZING SEWAGE FILTERS.
No. 535,516. Patented Mar. 12, 1895.
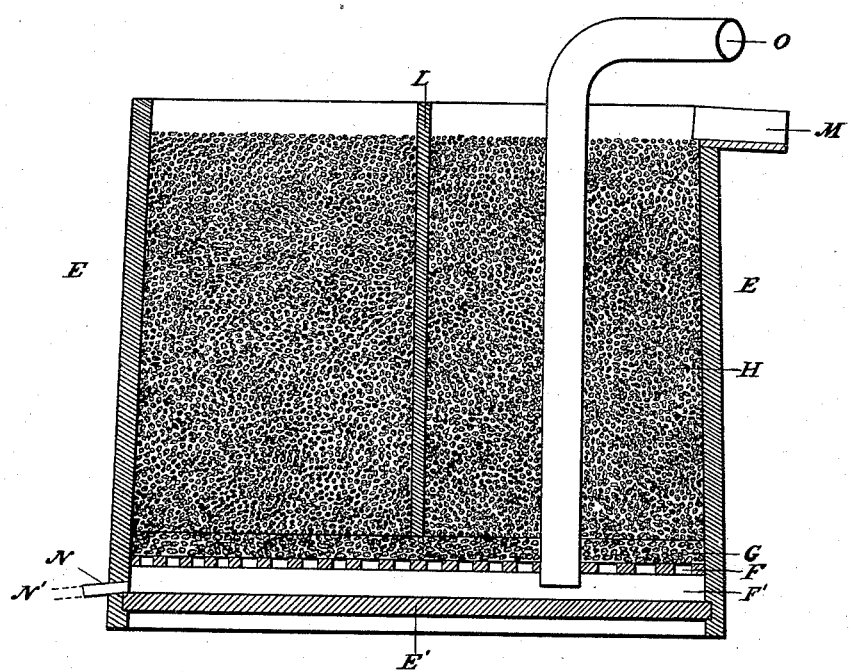
Witnesses
Inventor

UNITED STATES PATENT OFFICE.

GEORGE E. WARING, JR., OF NEWPORT, RHODE ISLAND.

METHOD OF DEODORIZING SEWAGE-FILTERS.

SPECIFICATION forming part of Letters Patent No. 535,516, dated March 12, 1895.

Application filed June 14, 1894. Serial No. 514,524. (No model.)

*To all whom it may concern:*

Be it known that I, GEORGE E. WARING, Jr., of Newport, in the county of Newport and State of Rhode Island, have invented a new and useful Improvement in the Art of Cleansing Filters to be Used in Sewage Disposal, of which the following is a specification.

The thorough cleansing of the filter used in a sewage disposal plant is of great importance, but so far as I know, no process had been discovered prior to my present invention whereby such a filter could be thoroughly and economically cleansed and its refuse removed as a harmless product.

My invention relates to a new process of treating the filter whereby such desirable result is attained and it consists in first draining the filter and then causing it to undergo an enforced oxidation such that each particle of solid will be brought into contact with oxygen, as for example, by the introduction of air under pressure. The air or other oxygen mixture, being preferably introduced below or into the midst of the filtering medium under pressure, will be confined more or less and cause thorough bacterial oxidation, escaping comparatively slowly. After the oxidation process has been carried on for a sufficient length of time, if thought best, the filter may be washed out by running a stream of water through it, or its contents may be shoveled over, or it may be cleansed mechanically in any other desired way. The oxidation being thorough however, the filter will be substantially in condition for immediate use, without washing.

The drawing illustrates means whereby this process may be applied to a filter suitable for treating sewage.

The filter tank E has a tight bottom E'. A short distance above it is supported a perforated false bottom F, which forms with the bottom E' a chamber F' to assist in the free distribution of air. On this false bottom I prefer to place a layer G of coarse material which interrupts the direct passage of air, causing it to be diffused more or less through the filter; this coarse material affording free voids, which being large, comparatively speaking, assist materially in free distribution of air. Upon this I place a heavy layer H of filtering material. To insure the flow of sewage through all parts of this filter, I prefer to divide it by a diaphragm L so that the sewage, being fed upon one side of this diaphragm, will pass down through the filtering medium, on one side of the diaphragm and up on the other side, overflowing at a point M. I have also provided an opening N for use in draining and cleansing the tank. This opening should be provided with suitable means for closing it (not shown) and may be connected by a suitable drain N' with the irrigation area. O is an air inlet connecting with an air compressor and running preferably to the bottom of the tank. This tank is fed with sewage from above. The opening N being closed, the sewage flows down on one side of the diaphragm L and up on the other side, escaping through the spout M to the irrigation area. Its passage through the filter is very slow and its suspended matters will attach themselves to the particles of the filtering medium, causing a certain amount of clarification of the liquid. In time the voids of the filtering medium will become clogged by the accumulated matter and the clarification of sewage will become insufficient. The flow should then be directed to another tank, this one being then thrown out of use. The outlet N should then be opened, allowing the free liquid to flow out; but as the upper surface of the filtering medium will be more or less gummy, the draining process will be slow as it will take considerable time for the air to permeate the filtering medium sufficiently to cause the entire displacement of the liquid. Thus the solid accumulated particles attached to the particles of the filter will retain a considerable portion of the liquid, and although exposed to the air which has taken the place of the escaped liquid, being moist will not be readily acted upon by it. Bacterial oxidation however, will now be set up to a certain extent, but cannot be thorough as the volume of contained air is insufficient to supply the requisite oxygen, nor is there any circulation such as will cause the displacement of the exhausted air with a fresh supply. In order to continue and to increase this oxidation the outlet N is closed and air from an air compressor or blower is forced through the pipe O into the interior of the filter, being preferably delivered into the chamber F' between the false bottom F and the tight bottom E'; but it is evident that this is a matter of convenience merely, as the end of the pipe O may rest in either of the layers above referred to, or into the mass of filtering medium. The air circulates through the filter and mixes thoroughly with the accumulated solids and the gases resulting from the oxidizing process which is taking place, are allowed to escape and are in fact forced to escape by the pressure of the incoming air which also furnishes fresh oxygen for the process.

After the process of oxidation has gone on for a sufficient time, the air supply being shut off, the filter may, if necessary, be washed out by passing clean water through it to be drawn off at M or at N, and the filtering process may then be resumed with it.

In any plant of sufficient size, there should be a number of these filters so that one may always be ready for immediate use.

I have used the term "filter," but this term has been used conventionally and not with the intention of confining my invention merely to a filter in the ordinary sense of the term. The device shown is one, which in practice, retains upon the surfaces of its particles the solid or slimy particles of sewage, and my process consists in purifying such a device after the circulation of the sewage has been stopped, by the introduction of air under pressure, which causes an oxidation of the impurities and purifies the mass without mechanical assistance, except in special cases, the air being caused to pass through the device so as to carry into it a practically inexhaustible amount of oxygen for the purpose, and thus differing essentially from any process in which air is retained without renewal and allowed to become stagnant.

What I claim as my invention is—

1. That improvement in the art of sewage disposal which consists in subjecting confined pieces of broken stone or the like, which form a filtering or straining medium, and are more or less coated with solid matter to the action of a current of air forced into and caused to be circulated through said medium continuously under pressure after the filtering process has ceased and the filter has been drained, whereby the organic matter accumulated therein is brought into contact with a continuous supply of oxygen, as set forth.

2. That improvement in the art of sewage disposal which consists in passing the sewage through a depositing chamber wherein matters in suspension will be deposited on the surfaces of the gravel or other suitable material with which it is supplied, and the subsequent draining of the chamber and the continued forcing into it of air when it has been drained, whereby the organic matter accumulated therein will come in contact with a constantly replenished supply of fresh oxygen, in the manner described.

In testimony whereof I have hereunto set my hand.

GEO. E. WARING, JR.

Witnesses:
F. W. PARQUHAR,
W. S. BLUNT.